(12) United States Patent
Davey

(10) Patent No.: US 8,794,975 B2
(45) Date of Patent: Aug. 5, 2014

(54) MOTOR AND COGNITIVE SKILLS DEVELOPMENT SYSTEM

(76) Inventor: Michelle D. Davey, Claremont, CA (US)

(*) Notice: Subject to any disclaimer, the term of this patent is extended or adjusted under 35 U.S.C. 154(b) by 1123 days.

(21) Appl. No.: 12/010,639

(22) Filed: Jan. 28, 2008

(65) Prior Publication Data

US 2009/0191528 A1    Jul. 30, 2009

(51) Int. Cl.
*G09B 19/00* (2006.01)

(52) U.S. Cl.
USPC ........................................ 434/258; 434/236

(58) Field of Classification Search
USPC .................. 434/247, 258, 250, 236; 473/414; 273/444; 482/15, 51
See application file for complete search history.

(56) References Cited

U.S. PATENT DOCUMENTS

| | | | |
|---|---|---|---|
| 3,345,068 A * | 10/1967 | Bowen | 473/414 |
| 3,515,385 A * | 6/1970 | Gunderson | 473/414 |
| 3,879,034 A * | 4/1975 | Petrusek | 273/444 |
| 5,156,409 A * | 10/1992 | Barnes | 273/444 |
| D393,499 S | 4/1998 | Brown | |
| 5,803,745 A | 9/1998 | Kozak et al. | |
| 5,997,304 A * | 12/1999 | Wood | 434/169 |
| 6,387,013 B1 | 5/2002 | Marquez | |
| 6,749,432 B2 * | 6/2004 | French et al. | 434/247 |
| 6,929,586 B2 * | 8/2005 | Johnson | 482/41 |
| 7,070,541 B2 | 7/2006 | Madigan et al. | |
| 7,465,263 B1 * | 12/2008 | Conrad et al. | 482/148 |
| 7,481,726 B2 * | 1/2009 | Hawk | 473/414 |
| 2001/0034288 A1 | 10/2001 | Howlett-Campanella | |
| 2002/0098947 A1 | 7/2002 | Brown | |
| 2004/0229731 A1 | 11/2004 | Mitchell | |
| 2005/0049125 A1 * | 3/2005 | Cloutier et al. | 482/142 |
| 2005/0153265 A1 | 7/2005 | Kavana | |
| 2006/0154220 A1 * | 7/2006 | Toniolo | 434/250 |
| 2006/0194651 A1 | 8/2006 | Hawk | |
| 2007/0054250 A1 | 3/2007 | Pahr | |
| 2007/0219024 A1 | 9/2007 | Allegre | |
| 2008/0096183 A1 * | 4/2008 | Cotran et al. | 434/428 |

OTHER PUBLICATIONS

Website, http://www.thelittlegym.com/motor-skill-development.aspx, general description of motor skill development program for children of various ages, two sheets printed from the internet on Oct. 22, 2007.

* cited by examiner

*Primary Examiner* — Peter Egloff
(74) *Attorney, Agent, or Firm* — Richard C. Litman

(57) ABSTRACT

The motor and cognitive skills development system includes a series of exercise mats having various instructional patterns thereon in increasing degrees or levels of physical and mental difficulty from very basic to more advanced moves and instructions. Each mat includes a complete series of exercise instructions thereon, with the exercises ranging from a relatively simple series of progressive jumps along the mat, to more complex jumps requiring only one foot, lateral or backward jumps, jump turns, etc. The instructions may range from simple representations of foot patterns through representations of various objects, colors, alphanumeric indicators, caricatures, etc. The development system thus challenges students both physically and mentally, with the instructor determining the exercise(s) to be performed and the corresponding mats according to the needs of the student(s) and/or curriculum. The system is adaptable to very young children, autistic students, adults and younger people with special training or rehabilitation needs, etc.

3 Claims, 12 Drawing Sheets

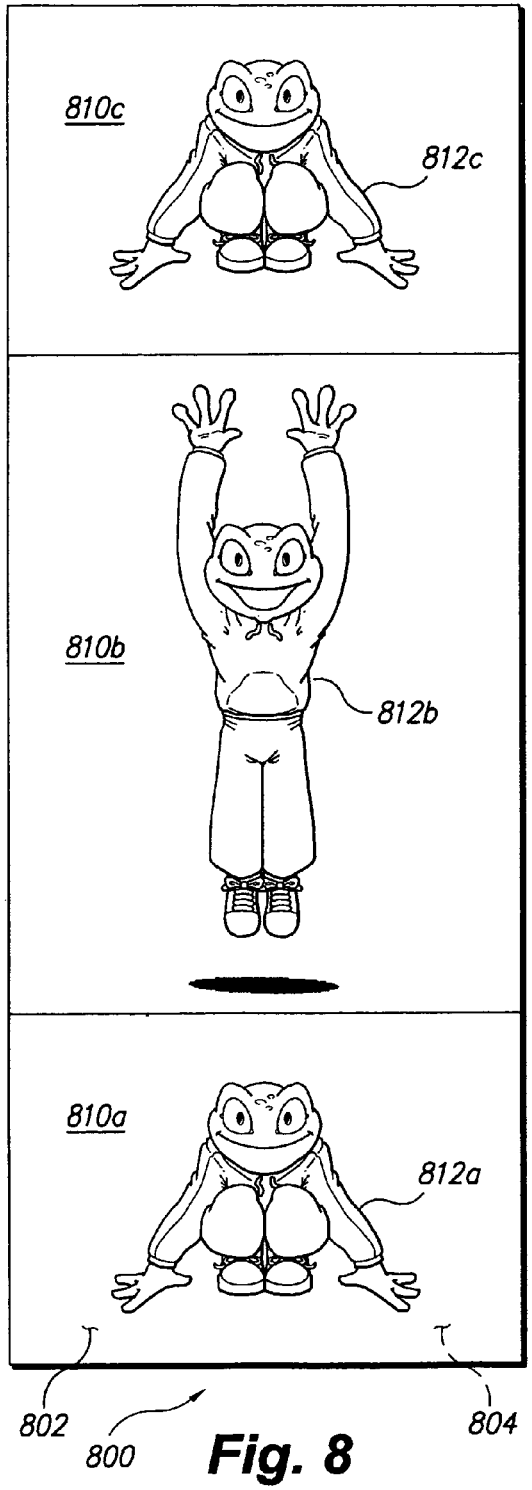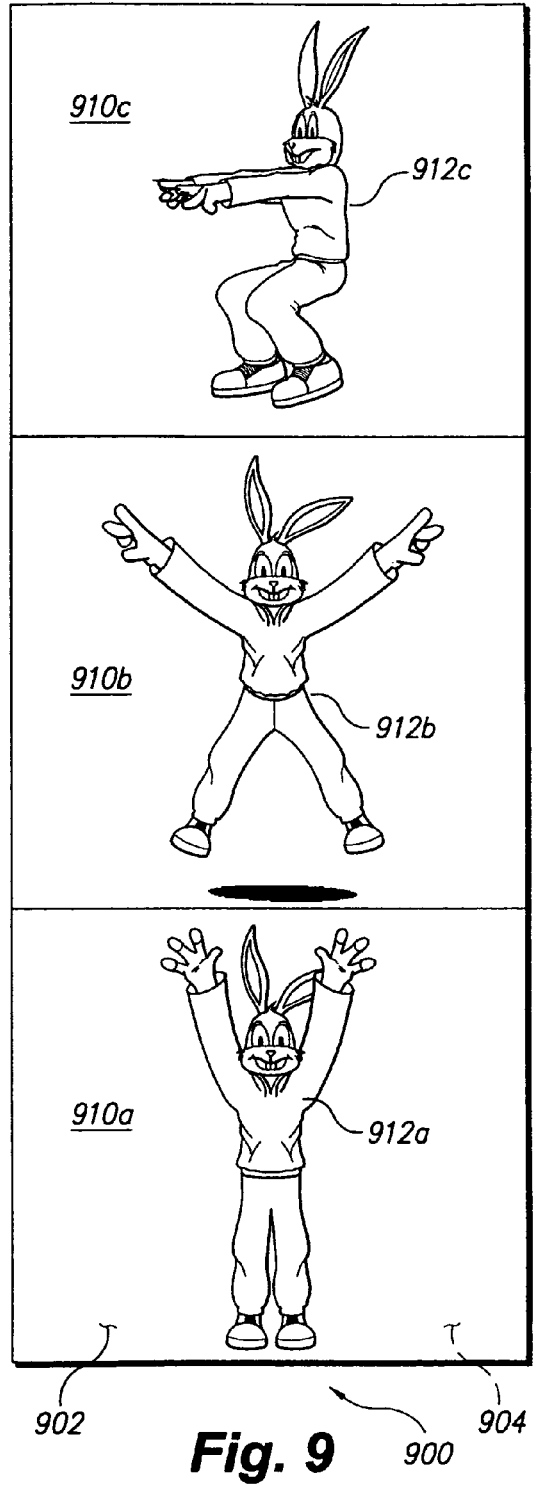

MOTOR AND COGNITIVE SKILLS DEVELOPMENT SYSTEM

BACKGROUND OF THE INVENTION

1. Field of the Invention

The present invention relates generally to educational devices and methods. More specifically, the present invention relates to a motor and cognitive skills development program that includes a series of exercise mats having various instructional patterns thereon in increasing degrees or levels of physical and mental difficulty from very basic to more advanced moves and instructions.

2. Description of the Related Art

The teaching of very basic physical and cognitive skills and knowledge to very young children and toddlers can be a difficult undertaking. The same is true of many other groups, e.g., persons suffering from autism or in need of special education or rehabilitation, etc. Explaining various jump activities, i.e., forward, backward, lateral, either or both feet, etc., may not be particularly difficult when communicating with a person having a reasonably good understanding of spoken instructions, or a person who is able to read and understand basic instructions. However, very young children or toddlers do not enjoy such a command of the language, and/or numbers and other symbols, for that matter. The same is true of children who speak and understand a different language from that of the instructor.

As a result, a number of different techniques have been employed to teach large muscle motor development skills, i.e., physical coordination, etc. These techniques generally rely upon individual markers, e.g., beanbags, variously shaped and colored cutouts or panels, hoops or rings, etc., with the teacher instructing the students to jump to, on, or into a given article. However, even if the student recognizes the command and can carry it out to some degree, the physical act of jumping or moving to the desired article tends to displace the article from its original location. Thus, not every student has the same task to perform at each turn. Moreover, instructions to perform more advanced maneuvers, e.g., jump to the side, jump using one foot, etc., may be more difficult for the instructor to convey verbally, and very young students or persons not familiar with the instructor's language will have some difficulty in understanding the wishes of the instructor.

Thus, a motor and cognitive skills development system solving the aforementioned problems is desired.

SUMMARY OF THE INVENTION

The motor and cognitive skills development system includes a series of exercise mats having instructions for performing a series of exercises thereon, with the instructions having increasing degrees of physical and/or mental difficulty. Each of the mats comprises a soft, cushioned sheet of material having non-slip lower and upper surfaces. The upper surfaces are each provided with instructions designating certain physical exercises, e.g., various jumps, etc., with those instructions being presented in various ways. For example, a very basic mat may have a series of positions thereon, each indicated by a representation of one or more feet. The foot representations may all be aligned longitudinally along the mat, indicating that the student is to jump straight ahead along the length of the mat, proceeding progressively from one position to the next. Different colors may be provided to combine the learning of basic mental skills or knowledge with the large muscle motor development produced by the physical jumping exercise. More advanced mats may include representations of various articles, e.g., automobile, boat, train, airplane, etc., and/or alphanumeric indicators, thus developing higher levels of mental learning, with other mats having more intricate exercise indicators, e.g., a single foot, jumping to and from various positions, turning while jumping, etc.

The physical and cognitive degrees of difficulty provided by the various mats of the series may be combined in different ways, depending upon the needs of the student and the curriculum used. For example, relatively simple visual instructions, such as foot position representations, may be combined with relatively intricate footwork requirements to complete a given exercise. More advanced indications, e.g., alphanumeric symbols, may be used with relatively simple and straightforward physical exercises, depending upon the needs of the student. In any case, the physical and/or mental challenges increase with successive mats in order to continue to challenge the student. Additional physical challenge may be provided in the form of raised barriers between different jump positions, or raised positions, on one or more of the mats. Optionally, the raised barriers or positions may be temporarily installable and removable.

These and other features of the present invention will become readily apparent upon further review of the following specification and drawings.

BRIEF DESCRIPTION OF THE DRAWINGS

FIG. 8 is a top plan view of another exemplary mat in the system, requiring a frog jump, with the jump postures indicated by a frog caricature in each position.

FIG. 9 is a top plan view of another exemplary mat in the system, requiring a straddle jump, with the jump postures indicated by an animal caricature in each position.

Similar reference characters denote corresponding features consistently throughout the attached drawings.

DETAILED DESCRIPTION OF THE PREFERRED EMBODIMENTS

The present invention relates to a motor and cognitive skills development system and method that includes a series of exercise mats having instructions thereon indicating different levels of exercise and cognitive difficulty for the student. The mats form the motor and cognitive skills development system, particularly when used by an instructor with an appropriate syllabus for the program. The mats are preferably used in increasing or ascending order of motor and/or cognitive skill difficulty.

Figure 1:
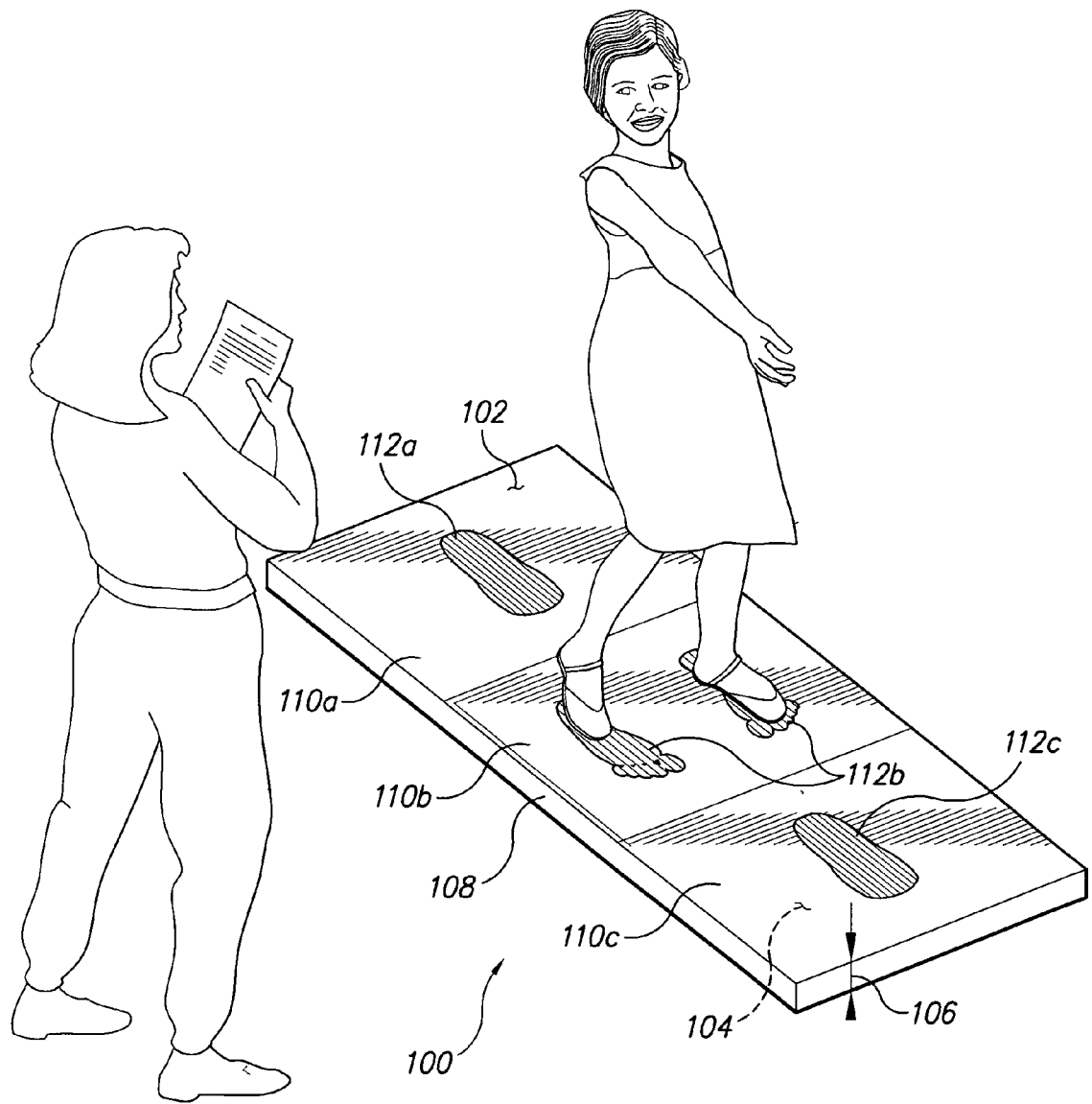
FIG. 1 is an environmental, perspective view of an exemplary mat of the motor and cognitive skills development system according to the present invention, showing its use.

FIG. 1 of the drawings is an environmental perspective view showing the use of an exemplary exercise mat 100. The exercise mat 100, and others in the series forming the system, has an upper surface 102, an opposite lower surface 104 defining a thickness 106 therebetween, and a periphery 108. Both the upper and lower surfaces 102 and 104 are preferably formed of a non-skid material, i.e., a material having a reasonably high coefficient of friction in order to reduce slippage of the mat upon the underlying surface during use and slippage of a person using the mat. The various exercise mats, e.g., the mat 100 of FIG. 1, are preferably formed of a reasonably resilient closed cell foam material in order to cushion the landing impact of the user, but any other practicable materials may be used to construct the mats as desired.

The upper surface 102 of the exercise mat 100 is divided into a series of exercise positions ranging from an initial exercise position 110a through a final exercise position 110c. Each of the positions 110a through 110c includes indicia, respectively 112a through 112c, forming an exercise instruction disposed upon the upper surface of the mat. In the exemplary mat 100 of FIG. 1, the indicia 112a through 112c comprise a series of representations of foot positions indicating or depicting the desired corresponding foot positions for a student progressing along the exercise positions 110a through 110c of the mat 100. The mat 100 depicts a series of relatively simple jumps, beginning with a single generic foot position or representation (i.e., not specifically representing either the left or right foot) centered in the first exercise position 110a for the initial exercise instruction 112a, continuing to a pair of foot representations comprising a left foot and a right foot for the next exercise instruction 112b, and ending with a single generic foot representation for the final exercise instruction 112c, centered in the final exercise position 110c.

It will be noted that the exercise instructions 112a through 112c of the mat 100 of FIG. 1 do not require the student to be able to recognize alphanumeric characters, printed instructions, or even colors, as all of the foot representations, positions or exercise instructions 112a through 112c are the same color in the exemplary mat 100 of FIG. 1. All the student need do is to recognize the shapes and orientations of the foot symbol exercise instructions 112a through 112c and understand that those symbols indicate the desired exercise activity, i.e., standing on the first instruction symbol 112a with either foot as instructed or as desired, jumping to the intermediate foot representations 112b with one foot landing on each foot symbol, and finally jumping to the last foot position or exercise instruction 112c to land thereon with either foot, as instructed or as desired. It should be noted that in many cases a student will begin with an exercise mat depicting even simpler or more basic jumps that do not require the student to balance upon one foot at any time. The exercise mat 100 of FIG. 1 is exemplary, and may not necessarily be used to introduce a student to the concepts of the system.

Figure 2:
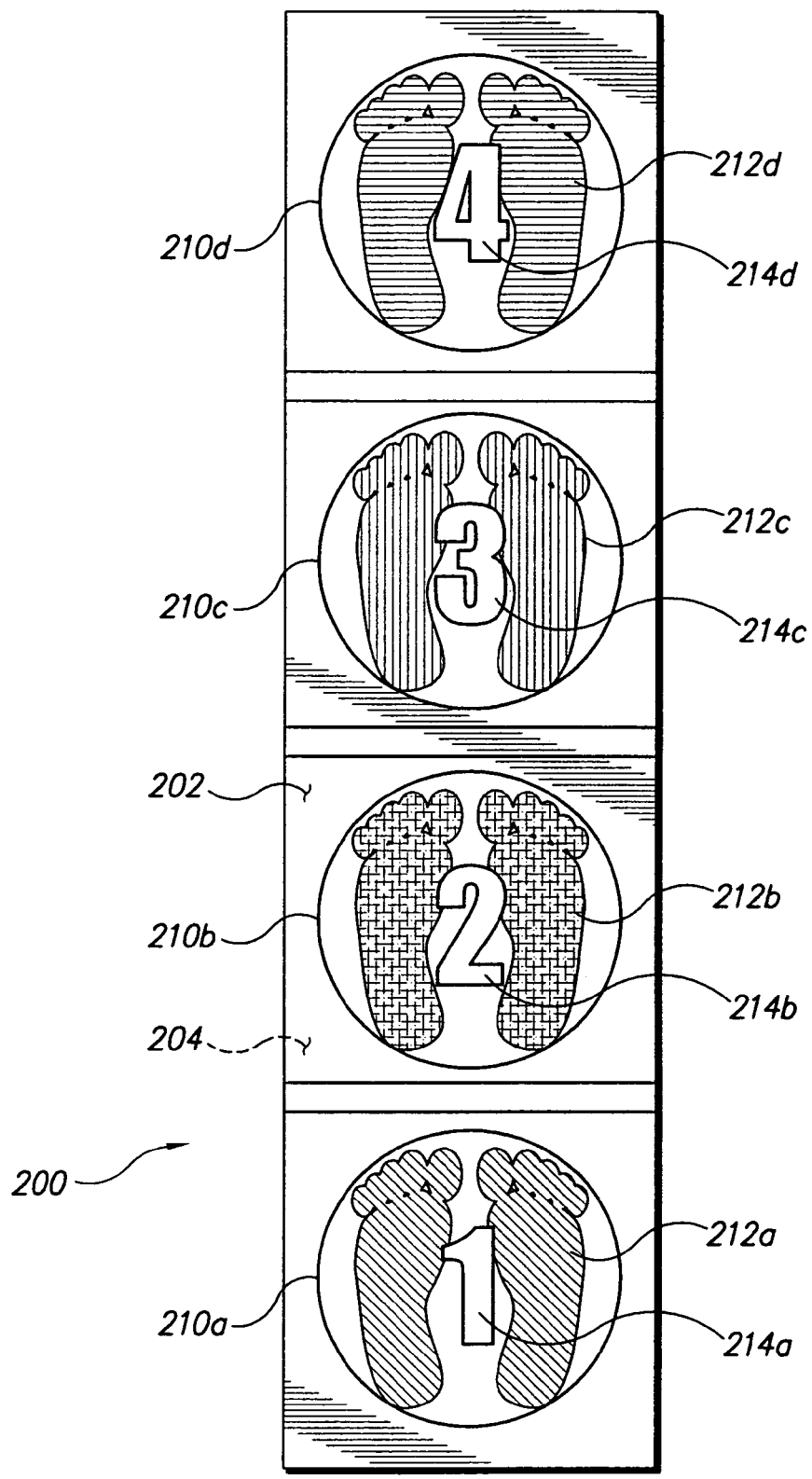
FIG. 2 is a top plan view of an exemplary basic mat of the system, incorporating pictorial and numerical designations for the jump positions.

FIG. 2 is a top plan view of a basic exercise mat 200 that might be used to introduce students to the concepts of the present invention. The exercise mat 200 might be used as an introduction to the skills development system of the present invention, as it requires a series of only very simple, basic jumps. The mat 200 is constructed or formed similarly to the mat 100 of FIG. 1, i.e., having non-skid or slip resistant upper and lower surfaces with a resilient core material therebetween and a series of exercise positions 210a through 210d displayed on the upper surface 202. The exercise positions 210a through 210d are shown by circles on the mat 200, as well as by rectangular areas defined by a series of lateral lines, as in the mat 100 of FIG. 1. Each of the exercise positions 210a through 210d includes an exercise instruction comprising a representation of a foot position thereon, or more accurately, respective foot pair position indicia 212a through 212d. It will be noted that these foot configuration exercise instructions 212a through 212d are all oriented in the same direction and, thus, require the student or user to make a short jump straight ahead to each successive exercise position and foot pattern instruction or position. The exercise mat 200 requires only very simple, basic muscular coordination on the part of the student or user, with relatively low demand in the manner of balance and no requirement for turning or changing the foot pattern or spacing in mid-jump.

However, it will be noted that each of the foot patterns, or exercise instructions 212a through 212d include indicia depicting a numeral thereon, respectively 214a through 214d, with each of the foot pattern exercise instructions being colored differently from one another. In the exemplary basic mat 200 of FIG. 2, the first foot position exercise instruction 212a is colored green and includes the number one thereon, the second foot position exercise instruction 212b is colored yellow and includes the number two thereon, the third foot position exercise instruction 212c is colored red and includes the number three thereon, and the fourth foot position exercise instruction 212d is colored blue and includes the number four thereon. (These colors are exemplary, and any colors as desired may be applied to the foot position exercise instructions 212a through 212d.) In this manner, a student who is incapable of recognizing the basic cardinal numerals may be instructed by referring to the instruction positions 212a through 212d by their colors, as depicted upon each of those positions. Students having more advanced cognitive skills, i.e., who are capable of recognizing the basic cardinal numbers, may be directed by referring to those numbers 214a through 214d upon each of the respective exercise instruction positions 212a through 212d.

Figure 3:
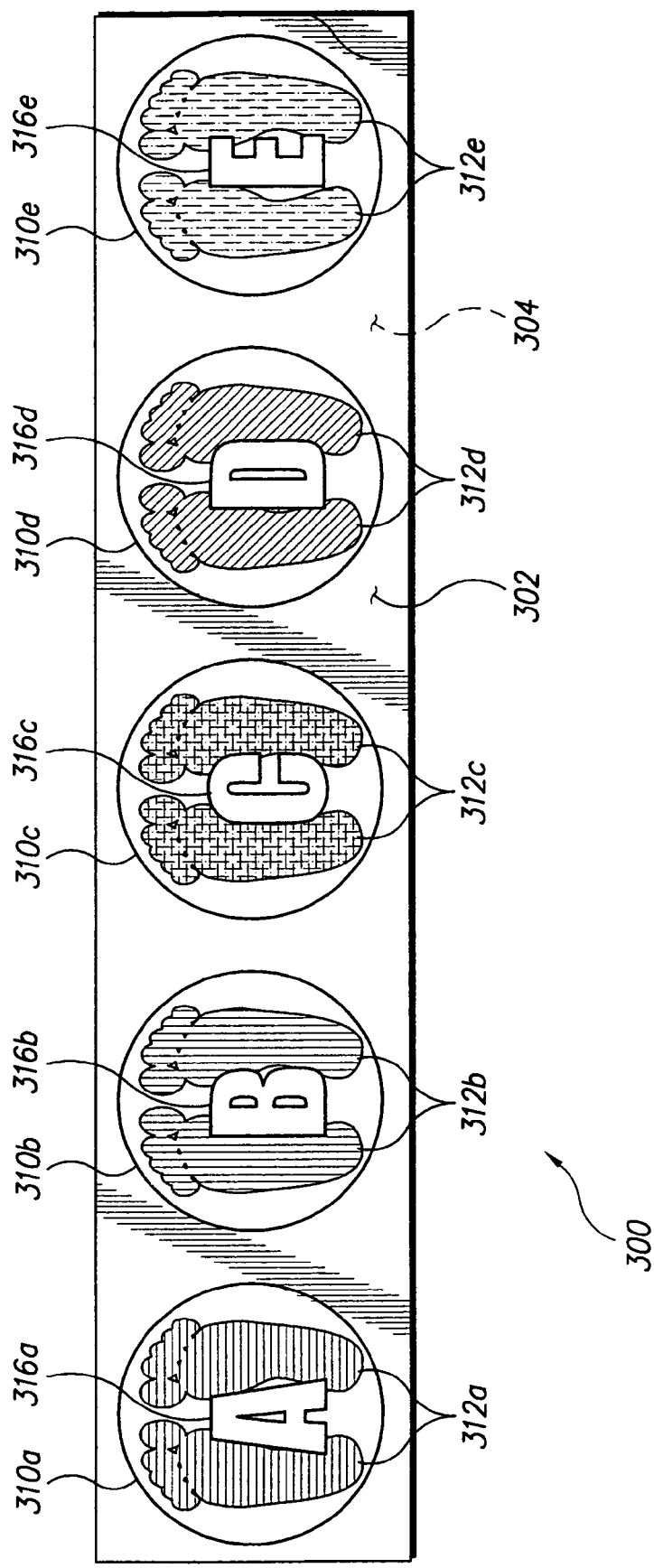
FIG. 3 is a top plan view of another exemplary mat in the system, requiring lateral jumps and incorporating pictorial and alphabetic designations for the jump positions.

FIG. 3 is a top plan view of an exemplary exercise mat 300 depicting a jump exercise of slightly greater difficulty than that depicted by the exercise mat 200 of FIG. 2. The mat 300 is configured at least generally like the mat 200 of FIG. 2, i.e., having non-skid opposed upper and lower surfaces 302 and 304 defining a thickness for the resilient core material and a series of exercise positions, in this case five such positions 310a through 310e, thereon. The positions 310a through 310e are defined by circles on the mat 300, as in the case of the circular positions 210a through 210d of the mat 200 of FIG. 2. Each of the exercise positions includes an exercise instruction therein, i.e., a instruction of the position to be taken by the student or user of the mat 300 on each of the instructions. As in the case of the mats 100 and 200 of FIGS. 1 and 2, the exercise instructions 312a through 312e are marked by a series of foot symbols. Those foot symbol exercise instructions 312a through 312e are colored differently from one another in order to permit a student having no knowledge of the alphabet to negotiate the mat 300 successfully. In the exemplary mat 300 of FIG. 3, the foot symbol exercise instructions 312a through 312e are respectively colored blue, red, yellow, green, and purple, although other colors or patterns, e.g., stripes, polka-dots, etc. may be used.

However, the mat 300 differs from the basic mat 200 in that it requires somewhat greater motor or muscular skills than does the mat 200. It will be noted that each of the exercise instructions 312a through 312e is designated by a pair of foot symbols, with those foot symbols oriented laterally relative to the length of the mat. This indicates that the user of the mat 300 must jump laterally from the first exercise instruction 312a to the next 312b, and so forth until reaching the last exercise instruction 312e. This results in a somewhat greater challenge for the student or user, in that jumping laterally is somewhat more difficult than a relatively simple forward jump.

It will be noted that rather than using numerical designators for the various exercise positions, the mat 300 utilizes a series of alphabetic symbols 316a through 316e. This requires perhaps a slightly greater level of cognitive skill or ability on the part of the user or student, as the student must have some knowledge of at least the initial order of the alphabet in order to successfully complete the lateral jumping exercises of the mat 300 when instructed by reference to the alphabetic characters 316a through 316e thereon. Thus, the mat 300 represents a requirement of at least a slightly higher level of motor and cognitive skill than does the basic mat 200. Normally, an instructor would initiate the present system by using the basic mat 200, and advance to the next level of mat 300 when students or users were judged to be sufficiently capable.

Figure 4:
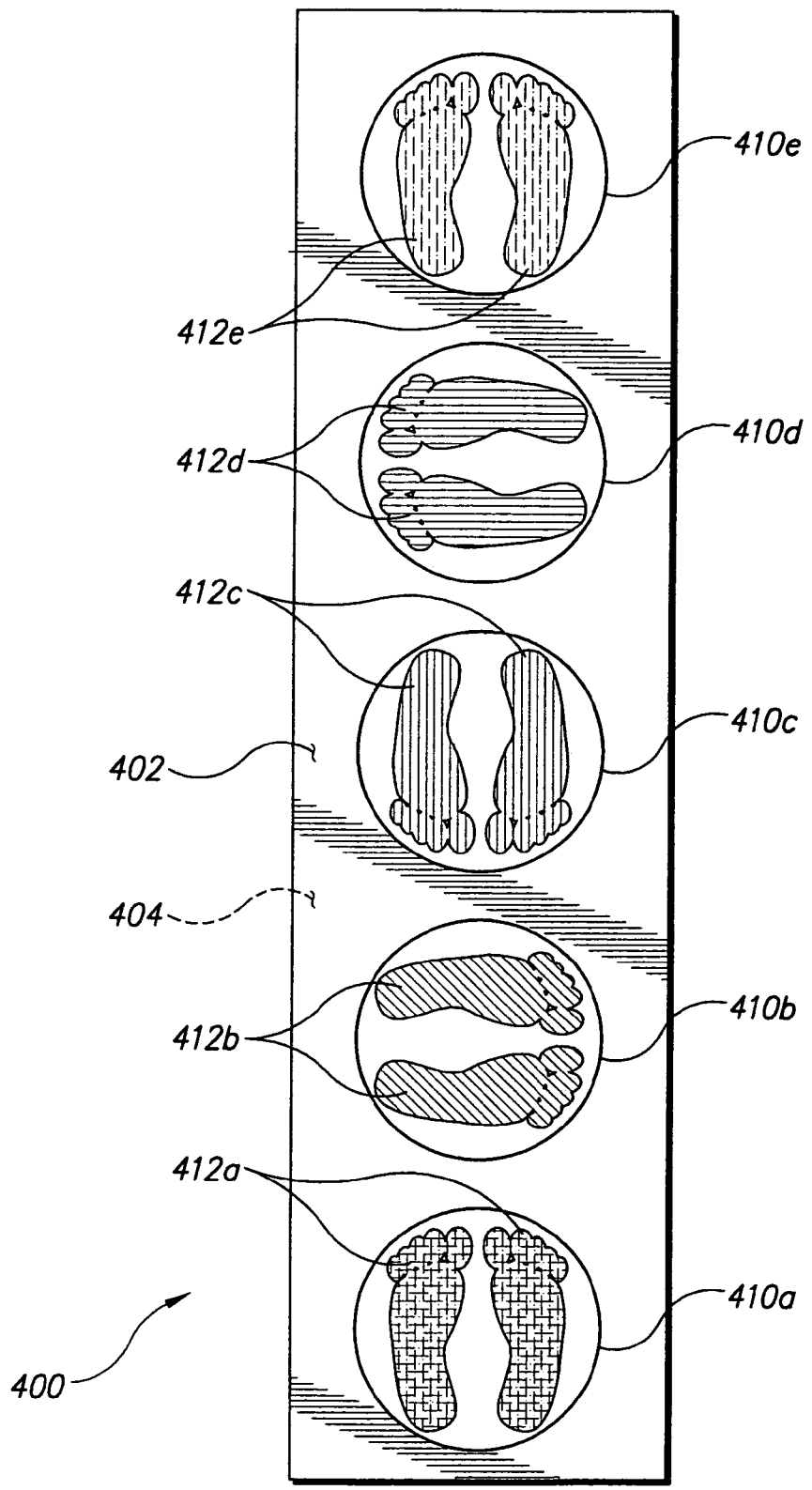
FIG. 4 is a top plan view of another exemplary mat in the system, requiring turning jumps and using pictorial designations.

The exercise mat 400 of FIG. 4 is configured at least generally like the mats 200 of FIG. 2 and 300 of FIG. 3, i.e., having non-skid opposed upper and lower surfaces 402 and 404 defining a thickness for the resilient core material and a series of exercise positions, in this case five such positions 410a through 410e, thereon. The positions 410a through 410e are defined by circles on the mat 400, as in the case of the circular positions 210a through 210d of the mat 200 of FIG. 2 and 310a through 310e of the mat 300 of FIG. 3. Each of the exercise positions includes an exercise instruction therein, i.e., a representation of the position to be taken by the student or user of the mat 400 on each of the instructions. As in the case of the mats 100 through 300 of FIGS. 1 through 3, the exercise instructions 412a through 412e are marked by a series of foot symbols. Those foot symbol exercise instructions 412a through 412e are colored differently from one another in order to permit a student having no knowledge of the alphabet to negotiate the mat 400 successfully. In the exemplary mat 400 of FIG. 4, the foot symbol exercise instructions 412a through 412e are respectively colored yellow, green, red, blue, and purple, although other colors or patterns, e.g., stripes, polka-dots, etc. may be used as desired.

However, the mat 400 differs from the basic mat 200 and higher level mat 300 in that it requires somewhat greater motor or muscular skills than do the mats 200 and 300. It will be noted that each of the exercise instructions 412a through 412e is designated by a pair of foot symbols, with those foot symbols turned 90 degrees clockwise with each succeeding position. This indicates that the user of the mat 400 must turn clockwise 90 degrees during the midpoint of each jump from one position to the next. This results in a somewhat greater challenge for the student or user than provided by the mat 300 of FIG. 3, in that turning in mid-air while jumping is somewhat more difficult than jumping laterally without turning.

It will be noted that the mat 400 of FIG. 4 does not include any numerical or alphabetic indicators or symbols, as do the mats 200 and 300. The mat 400 might be used in teaching or training slightly older or more advanced students who are capable of the more advanced motor skills required, but for some reason have not yet developed the cognitive skills required for recognition of numerical or alphabetic characters. Alternatively, the mat 400 could be provided with such characters or symbols, or others (e.g., Roman numerals, etc.), if so desired in order to require more advanced cognitive skills for the mat 400.

Figure 5:
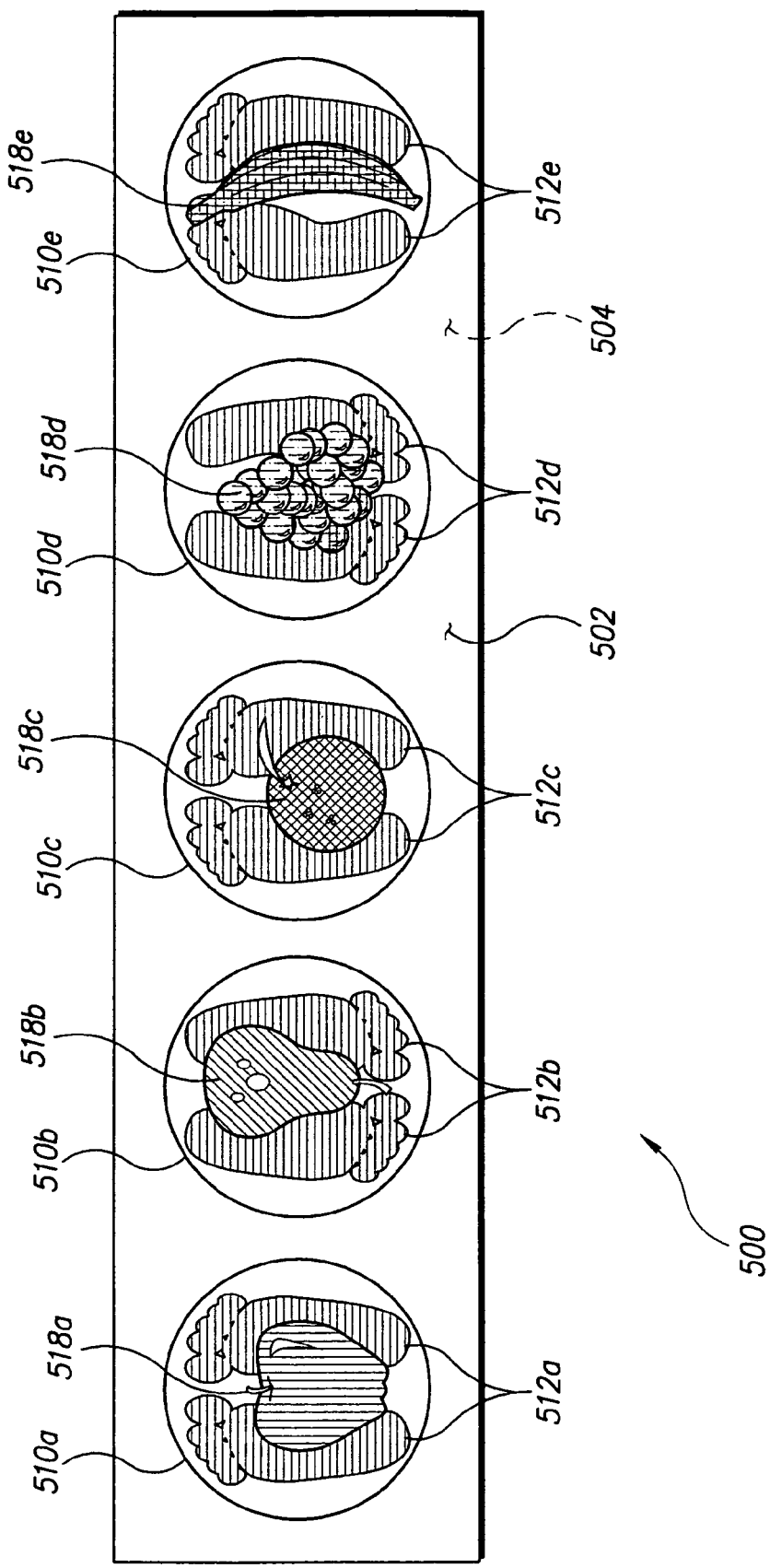
FIG. 5 is a top plan view of another exemplary mat in the system, requiring turning jumps and using pictorial representations on the jump positions.

FIG. 5 is a top plan view of an exemplary exercise mat 500 depicting a jump exercise of slightly greater difficulty than that depicted by the exercise mat 400 of FIG. 4. The mat 500 is configured at least generally like the mats 200 through 400 of FIGS. 2 through 4, i.e., having non-skid opposed upper and lower surfaces 502 and 504 defining a thickness for the resilient core material and a series of exercise positions, in this case five such positions 510a through 510e, thereon. The positions 510a through 510e are defined by circles on the mat 500, as in the case of the circular positions 210a through 210d of the mat 200 of FIG. 2 and others. Alternative non-circular shapes may be used for the exercise positions of the mat 500 and other mats, if so desired. Each of the exercise positions includes an exercise instruction therein, i.e., a representation of the position to be taken by the student or user of the mat 500 on each of the instructions. As in the case of the mats 100 through 400 of FIGS. 1 through 4, the exercise instructions 512a through 512e are marked by a series of foot symbol exercise instructions 512a through 512e. All of the foot symbol exercise instructions 512a through 512e of the mat 500 are colored identically to one another in this example, e.g., blue, for reasons explained further below.

As in the case of the mats 200 through 400 of FIGS. 2 through 4, the mat 500 requires a somewhat higher level of motor or muscular skills, as it represents the next step in the exercise mat series of the skills development system of the present invention. It will be noted that each of the exercise instructions 512a through 512e is designated by a pair of foot symbols, with those foot symbols turned 180 degrees or reversed relative to one another with each succeeding position. This indicates that the user of the mat 500 must turn 180 degrees during the midpoint of each jump from one position to the next. This results in a somewhat greater challenge for the student or user than provided by the mat 400 of FIG. 3, in that reversing direction in mid-air while turning is somewhat more difficult than turning only 90 degrees while jumping.

It will be noted that rather than using numerical or alphabetic designators for the various exercise positions, the mat 500 utilizes a series of pictorial symbols or representations of objects 518a through 518e. This requires perhaps a slightly greater level of cognitive skill or ability on the part of the user or student, as the student must be able to recognize the objects, and perhaps the class of objects, in order to successfully complete the lateral jumping exercises of the mat 500 when instructed by reference to the symbols or representations 516a through 516e thereon. Thus, the mat 500 represents another step up the level of motor and cognitive skill required than does the previous mat 400. In the example of the mat 500 of FIG. 5, the symbols 518a through 518e respectively represent an apple, a pear (or perhaps an avocado), an orange, a bunch of grapes, and a banana, and are correspondingly colored red, green, orange, purple, and yellow. As the symbols or representations 518a through 518e are colored differently from one another, there is no need to provide different colors for each of the foot symbol exercise representations or instructions 512a through 512e on the mat 500, and they may all be the same color, e.g., blue, or at least a different color from that used for any of the symbols 518a through 518e. Alternatively, other symbols may be used, e.g., different geometric or polygonal shapes, different animal species, etc., as desired.

Figure 6:
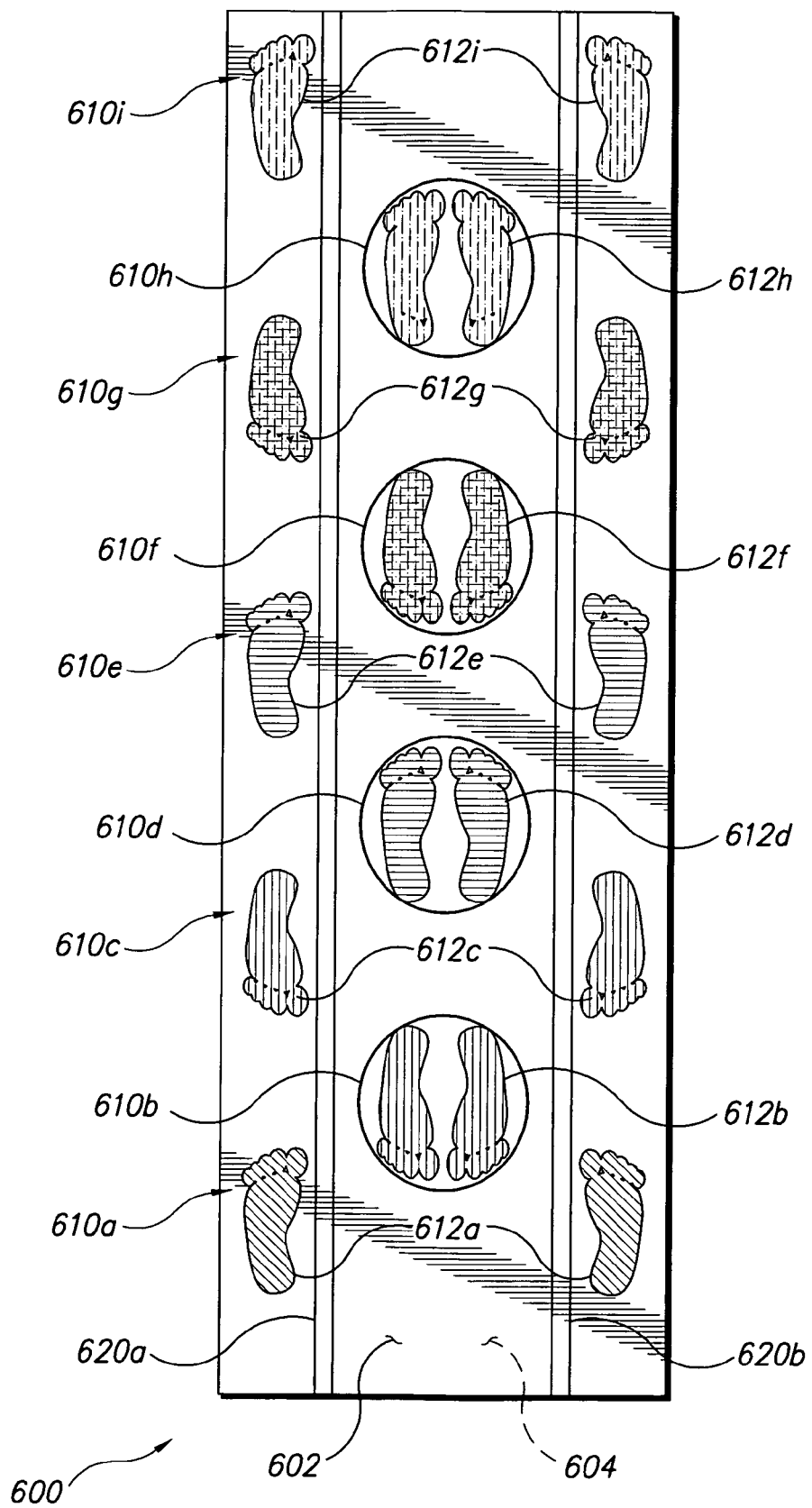
FIG. 6 is a top plan view of an exemplary more advanced mat in the system, requiring turning and alternating straddle jumps, and using pictorial representations.

The exercise mat 600 of FIG. 6 represents yet another step or advance in the degree of difficulty of the exercises represented, over the mat 500 of FIG. 5. The exercise mat 600 of FIG. 6 is configured at least generally like the mats 200 through 500 respectively of FIGS. 2 through 5, i.e., having non-skid opposed upper and lower surfaces 602 and 604 defining a thickness for the resilient core material and a series of exercise positions, in this case nine such positions 610a through 610i, thereon. Each of the exercise positions includes a corresponding exercise instruction therein, i.e., an instruction of the position to be taken by the student or user of the mat 600 on each of the instructions. These exercise instructions are designated as foot position symbols or instructions 612a through 612i on the mat 600 of FIG. 6.

The jumping exercises required by the mat 600 are somewhat more advanced than those required by the mats 200 through 500. It will be noted that two laterally offset longitudinal lines 620a and 620b are placed on the upper surface 602 of the mat 600, with positions 610a, 610c, 610e, 610g, and 610i disposed to the outside of these lines and alternating positions 610b, 610d, 610f, and 610h positioned between the lines. This requires the student or user to initiate the exercise with his or her feet widely spread and positioned upon the two foot symbols 612a of the initial position 610a. The student then jumps to the second position 610b while drawing his or her feet close together and turning 180° in mid-jump, as the two foot symbol instructions 612b are close to one another within the two lines 620a and 620b and reversed in their orientation relative to the initial foot position symbol instructions 612a.

It will be noted that the next position, i.e., foot position instructions 612c, are again widely spread, and are also reversed by 180° relative to the initial position instructions 612a. This requires the student or user of the mat 600 to jump backwards from the position 610b and spread his or her feet to land upon the foot symbol instructions 612c. It will be seen that this is a somewhat more difficult exercise than that represented on the exercise mat 500 of FIG. 5, which only required the student or user to turn 180° with each lateral jump, rather than alternately spreading the feet and drawing them closer together. The student continues to make the jumps as indicated by the exercise mat 600 of FIG. 6, by alternately spreading the feet to straddle the two lines 620a and 620b and drawing the feet together for the next jump, and turning 180° with each jump to one of the center positions 610b, 610d, 610f, or 610h.

While the jumping exercises required of the mat 600 are somewhat more advanced than those of the previous mat 500, it will be noted that the only differentiation between the different exercise instruction symbols 612a through 612i is by color. In the case of the exercise mat 600, the first foot instruction positions 612a are green with each two subsequent instruction positions sharing the same color, e.g., instruction positions 612b and 612c are red, instruction positions 612d and 612e are blue, etc. As in the case of the color differentiated instruction positions of the mat 400, the mat 600 might be used in teaching or training slightly older or more advanced students who are capable of the more advanced motor skills required, but for some reason have not yet developed the cognitive skills required for recognition of numerical or alphabetic characters. Alternatively, the mat 600 could be provided with such characters or symbols, or others (e.g., Roman numerals, etc.), if so desired in order to require more advanced cognitive skills for the mat 600.

Figure 7:
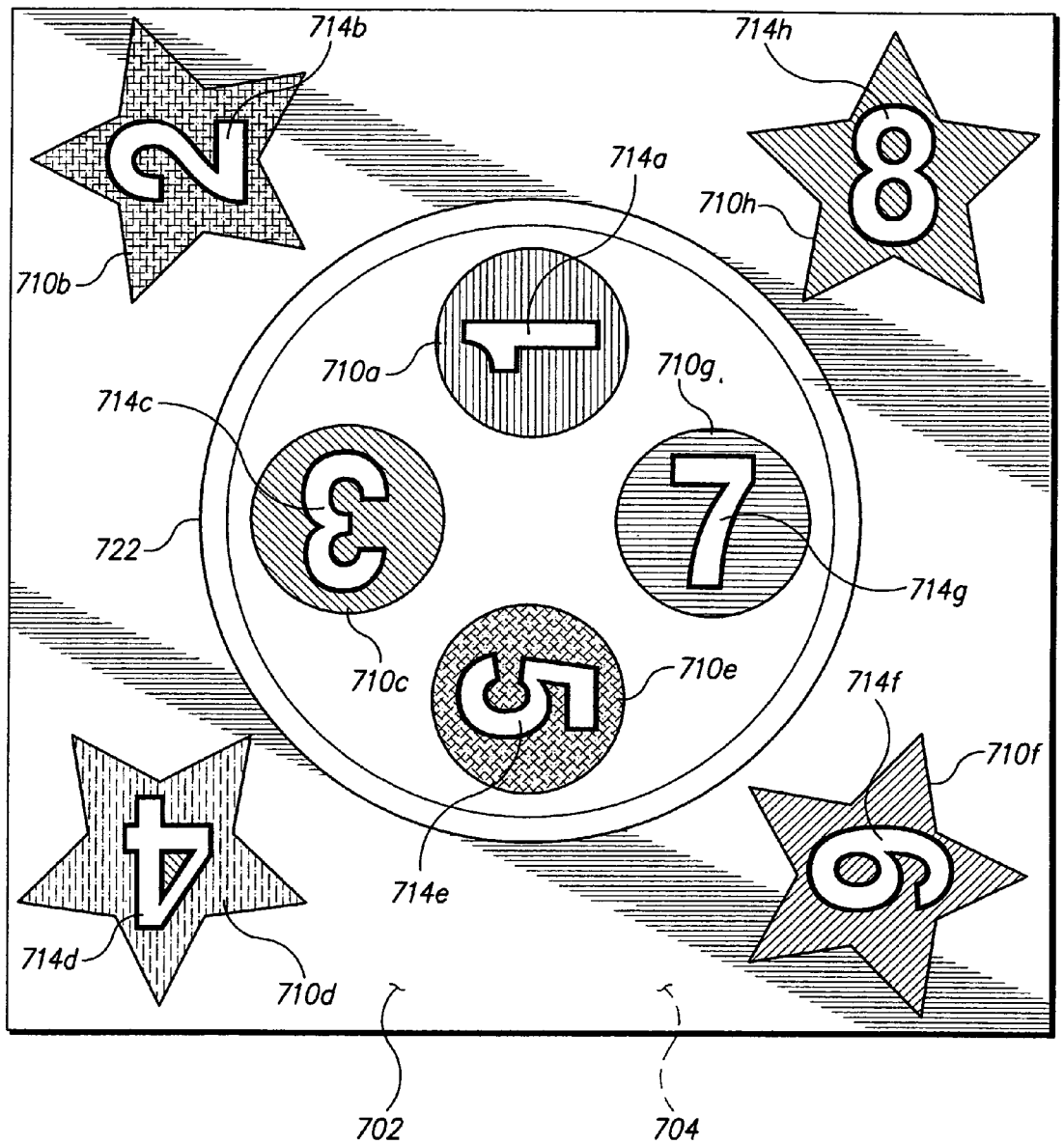
FIG. 7 is a top plan view of another exemplary mat in the system requiring jumps to different positions, with the positions indicated by a sequential numerical series.

FIG. 7 provides a top plan view of yet another alternative mat configuration, designated as exercise mat 700. The mat 700 includes an upper surface 702 and opposite lower surface 704 defining a thickness therebetween, as in the cases of the other mats 100 through 600 described further above. However, rather than having an elongate configuration and requiring the jumps to be made in a generally linear path, the mat 700 is square and contains a series of exercise positions 710a through 710h arranged in an evenly spaced array thereon. Four of the eight positions are contained within an inner border 722, e.g., a circle disposed upon the upper surface 702, with the remaining four positions being placed outside the circle.

It will be noted that the exercise mat 700 does not include any foot symbol instructions thereon, but rather uses somewhat more abstract position markers for the positions 710a through 710h. Some of the position markers are in the form of simple circles, while others are in the form of stars. The specific shape or configuration is not critical. It will also be noted that the various markers or positions 710a through 710h are variously colored, similarly to the different colors used to designate the various positions of the mats of FIGS. 2 through 6. However, additional challenge is provided by the numerals 714a through 714h placed upon the corresponding positions 710a through 710h. It will be noted that while the numbers 714a through 714h are in consecutive order, only odd numbers 714a, 714c, 714e, and 714g are located within the circular border 722, with only even numbers 714b, 714d, 714f, and 714h being located outside the border 722.

The provision of different shapes for the positions, the inclusion of some of the positions within a separate zone or border, and the use of a series of consecutive numbers to designate the various positions, provides a series of different alternatives for the instructor and student. For example, the instructor may instruct a student who cannot read the numbers to "jump from the red circle to the yellow star," i.e., positions 710a and 710b designated by the cardinal numerals one and two. Students who know the cardinal numerals may be instructed by reference to those numerals, and may be required to perform a somewhat more advanced exercise by turning to orient themselves with the orientation of the number of the position to which they are jumping. It should be noted that the numbers may be replaced by various other symbols, e.g., mathematical symbols, tools or implements, letters of the alphabet, etc., as desired. It should also be noted that as there is no indication of a specific pattern or orientation for either or both feet, the instructor may ask more advanced students to jump using a single foot with the exercise mat 700. Thus, the mat 700 of FIG. 7 represents somewhat more challenge for both motor and cognitive skills, than do the other mats previously discussed to this point.

FIGS. 8 and 9 provide illustrations of mats 800 and 900, each having a caricature thereon to indicate the desired jumping exercise. The exercise mats 800 and 900 are constructed similarly to the mats previously discussed, i.e., having upper and lower surfaces 802, 804 and 902, 904 defining thicknesses therebetween, with the upper surfaces 802 and 902 having representations of jumping exercises thereon. The exercise mat 802 includes three exercise positions 810a through 810c thereon, with each of the positions having an animal instructional caricature thereon, e.g., a frog, in the case of the mat 800. While an instructional caricature of an animal known for its jumping ability may be preferred in order to associate with the jumping exercise, it is not an essential of the present system.

It will be noted that the caricature instructions 812a through 812c represent three different jump postures to be performed during the course of the jump exercise directed by the mat 800. The first exercise representation or instruction 812a shows the instructional caricature 812a in a squatting position, as would be appropriate for a frog. The second instructional caricature 812b shows the caricature in mid-jump, and fully extended. Finally, the third instructional caricature 812c shows the caricature having completed the jump, and having returned to the squatting posture or position. While it may be possible for the exercising student to travel forward from the first position 810a to the final position 810c during the jump, this is not an absolute requirement when undertaking such a "squat-jump" from an initially squatting position or posture.

The exercise mat 900 of FIG. 9 is similar to the mat 800 of FIG. 8, but illustrates the initial, mid-jump, and final positions for a "straddle jump," as might be made using the exercise mat of FIG. 6. As in the case of the caricature mat 800 of FIG. 8, the mat 900 of FIG. 9 includes a series of three positions 910a, 910b, and 910c, with a rabbit instructional caricature representing the corresponding three exercise postures 912a, 912b, and 912c. From the initial exercise posture or instruction 912a, the student jumps to spread the legs and feet apart during mid-jump as indicated by the intermediate instructional caricature 912b. The final caricature instruction 912c shows the instructional caricature with feet slightly spread and knees bent, while having turned nearly 90 degrees. This final posture may be varied by requiring the student to land with feet together and straight ahead, or in various final jump postures as desired.

Figure 10:
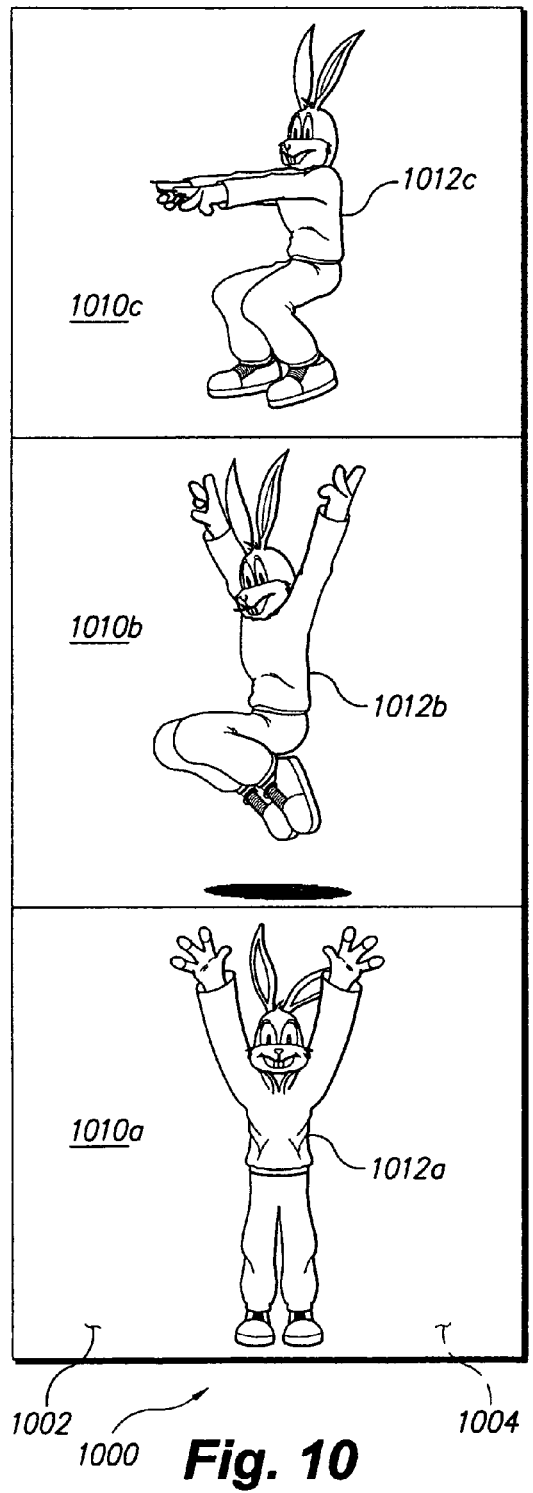
FIG. 10 is a top plan view of another exemplary mat in the system, requiring a tuck jump, with the jump postures indicated by an animal caricature in each position.
Figure 11:
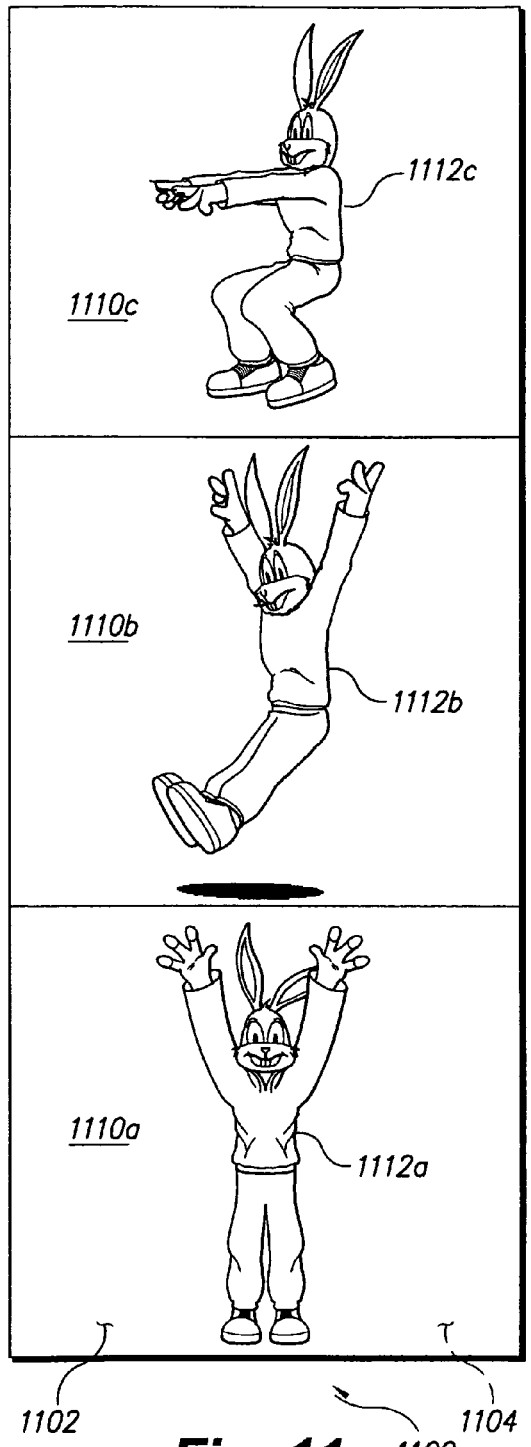
FIG. 11 is a top plan view of another exemplary mat in the system, requiring a pike jump, with the jump postures indicated by an animal caricature in each position.

FIGS. 10 and 11 provide illustrations of mats 1000 and 1100, similar to the caricature exercise mats 800 and 900 respectively of FIGS. 8 and 9 but illustrating different jump styles. The exercise mats 1000 and 1100 are constructed similarly to the mats previously discussed, i.e., having upper and lower surfaces 1002, 1004 and 1102, 1104 defining thicknesses therebetween, with the upper surfaces 1002 and 1102 having representations of jumping exercises thereon. The exercise mat 1002 includes three exercise positions 1010a through 1010c thereon, with each of the positions having an animal instructional caricature thereon, e.g., a rabbit, in the case of the mat 1000. Again, a caricature of an animal known for its jumping ability may be preferred in order to associate with the jumping exercise, but it is not an essential of the present system.

As in the cases of the mats 800 and 900 of FIGS. 8 and 9, the caricature instructions 1012a through 1012c represent three different jump postures to be performed during the course of the jump exercise directed by the mat 1000. The first exercise instruction or position 1012a shows the instructional caricature 1012a in an upright position with arms raised. The second instructional caricature 1012b shows the caricature in mid-jump, with the legs pulled upwardly in a "tuck" position or posture. Finally, the third instructional caricature 1012c shows the caricature having completed the jump, with the legs bent at the knees and hips in a semi-tuck position and arms extended horizontally. As in the cases of the exercise mats 800 and 900 of FIGS. 8 and 9, it may be possible for the exercising student to travel forward from the first position 1010a to the final position 1010c during the jump. However, this is not an absolute requirement when undertaking such a "tuck-jump" from an initial standing position or posture.

The exercise mat 1100 of FIG. 11 is similar to the mats 800 through 1000 of FIGS. 8 through 10, but illustrates the initial, mid-jump, and final positions for a "pike jump." As in the case of the mats 800 through 1000 of FIGS. 8 through 10, the mat 1100 of FIG. 11 includes a series of three positions 1110a, 1110b, and 1110c, with a rabbit instructional caricature representing the corresponding three exercise postures 1112a, 1112b, and 1112c. The initial exercise posture or instruction 1112a is similar to that shown by the initial instruction 1012a of the mat 1000 of FIG. 10, i.e., upright with arms extended. However, the mid-jump posture shown by the instructional caricature 1112b is somewhat different from the "tuck-jump" posture illustrated by the instructional caricature 1012b of the mat 1000 of FIG. 10. Rather than tucking the legs upwardly, the legs are extended at an angle from the hips, as illustrated by the instructional caricature 1112b in FIG. 11. Finally, the landing position 1112c is accomplished with the legs bent at knees and hips and the arms extended horizontally, similarly to the final instruction 1012c shown on the mat 1000 of FIG. 10. Again, variations on these jumps and postures may be assigned according to the abilities of the students, but it will be seen that generally, the jumps illustrated in FIGS. 8 through 11 require some additional level of physical skill over those jumps shown on the mats 200 through 700 of FIGS. 2 through 7. Additional challenge may be provided by requiring such mid-jump maneuvers as shown particularly in FIGS. 9 through 11, with the various jump indications and instructions provided on the various other mats 100 through 700.

Figure 12:
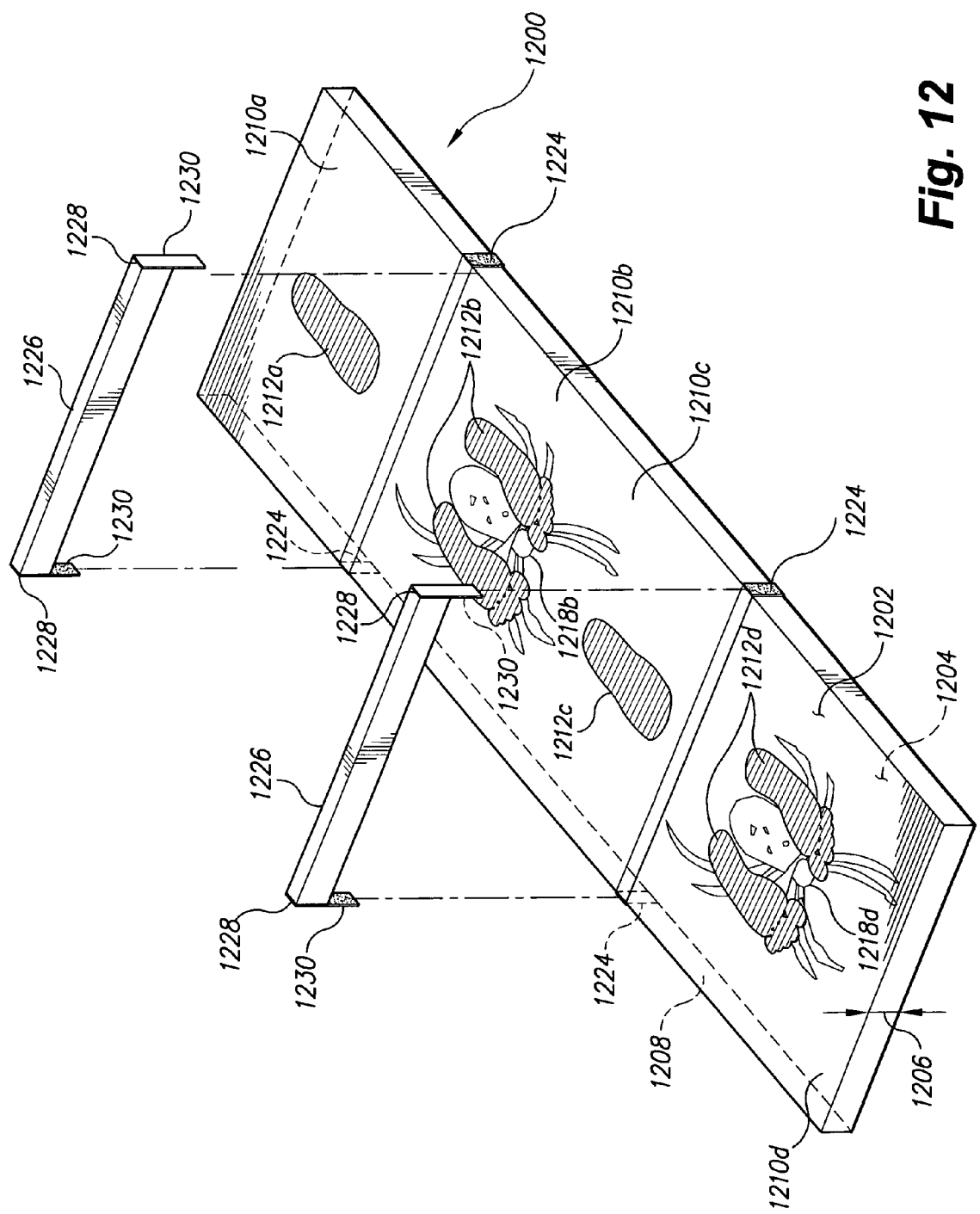
FIG. 12 is an exploded perspective view of an exemplary relatively basic mat in the system having detachable barriers between positions.
Figure 13:
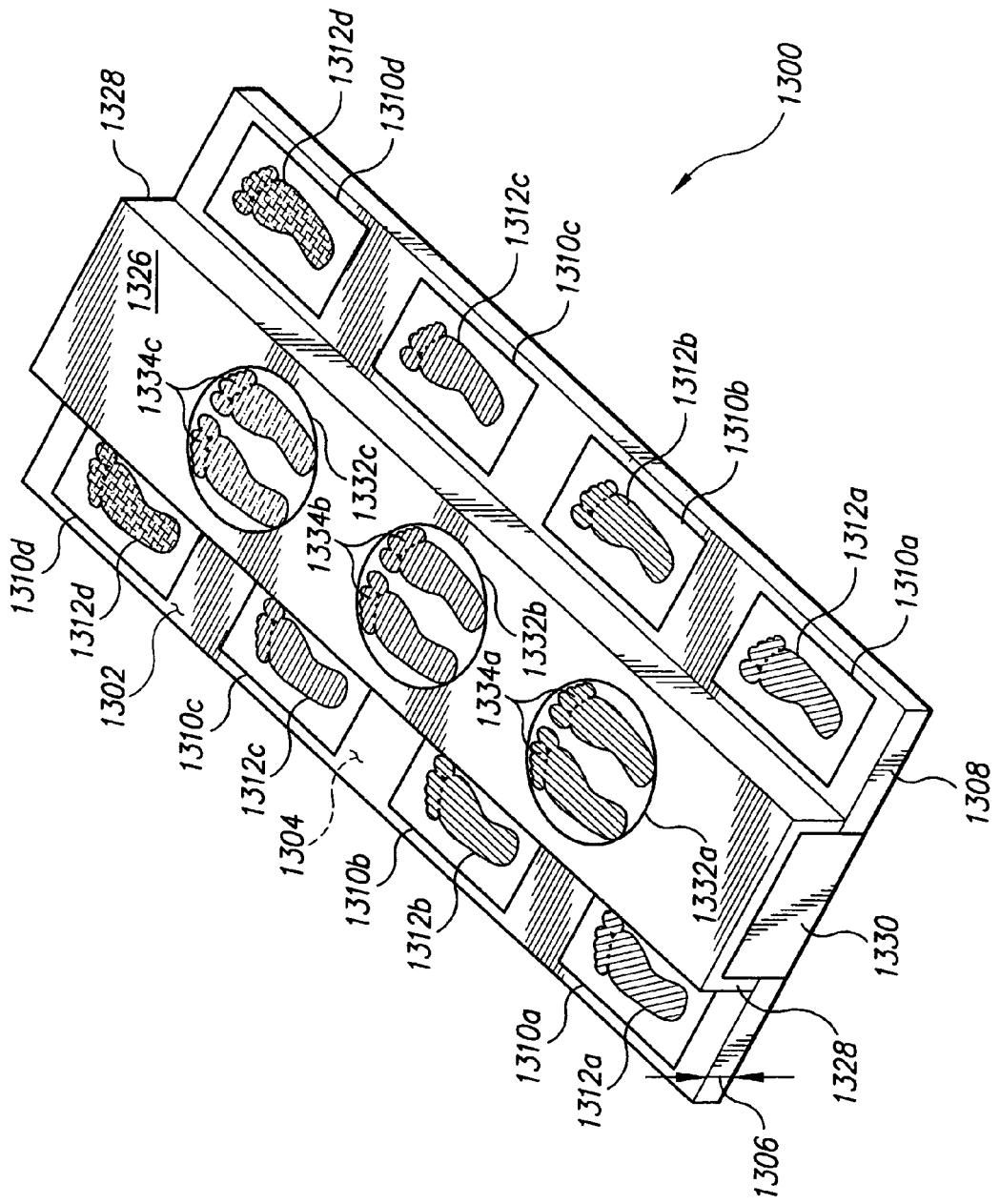
FIG. 13 is a perspective view of another exemplary mat in the system, requiring alternating straddle jumps and having a removable raised central area.
Figure 14:
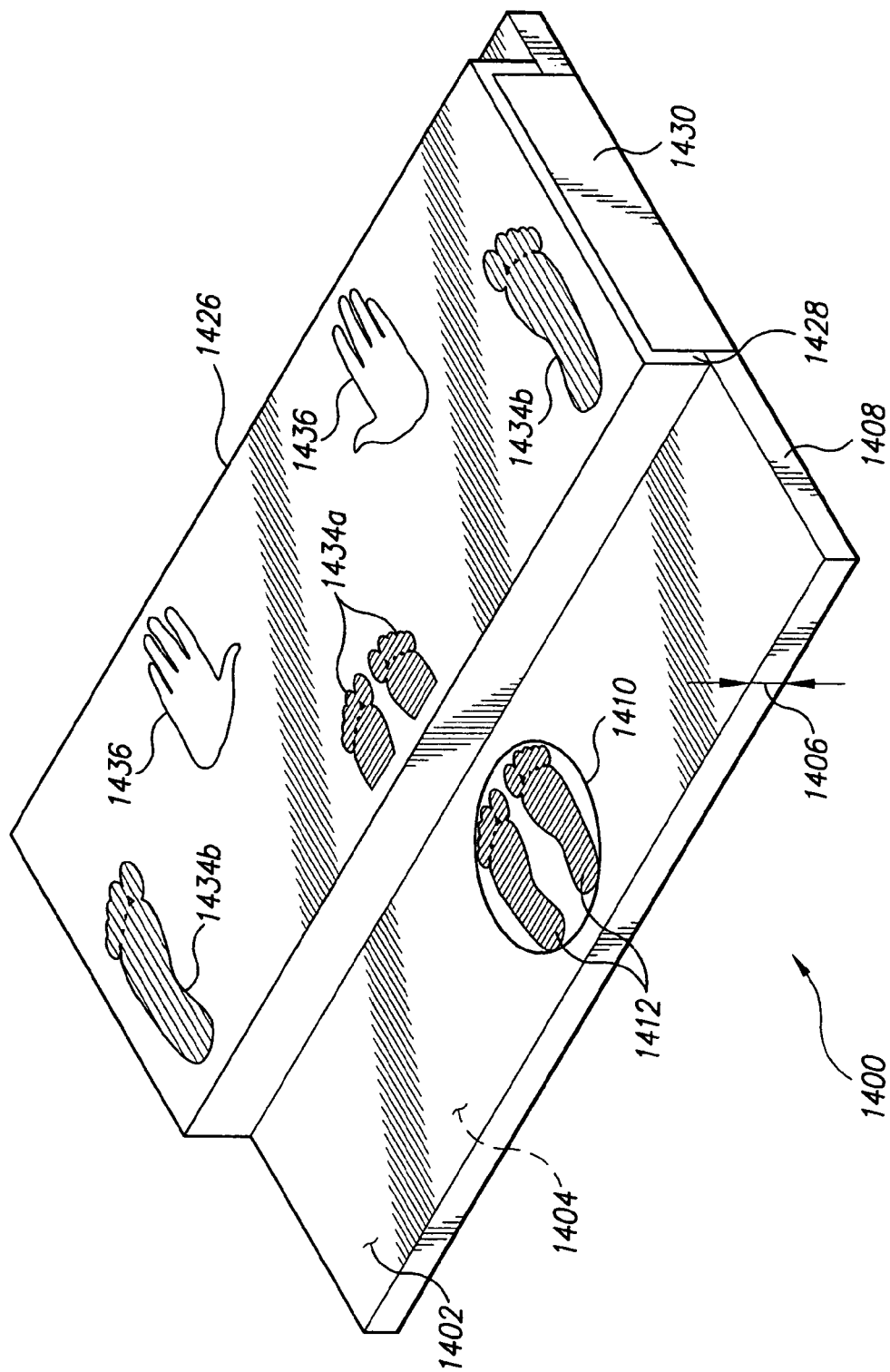
FIG. 14 is a perspective view of another exemplary mat in the system, requiring squat and straddle jumps and having a removable raised forward area.

FIGS. 12 through 14 illustrate alternative mat configurations wherein one or more raised partitions, portions, or levels may be installed thereon. The mat 1200 of FIG. 12 will be seen to be somewhat similar to the mat 100 of FIG. 1, i.e., having an upper surface 1202, an opposite lower surface 1204 defining a thickness 1206 therebetween, and a periphery 1208. The mat 1200 is divided into a series of four exercise positions 1210a through 1210d. The mat 1200 depicts a series of relatively simple jumps, beginning with a single generic foot position or representation for the initial exercise instruction 1212a, continuing to a pair of foot representations for the next exercise instruction 1212b and then to another single generic foot position 1212c, and ending with another pair of foot representations for the final exercise instruction 1212d. The mat 1200 may include caricatures at various areas thereon, similar to the mat 500 of FIG. 5. In the case of the mat 1200, spider caricatures or representations 1218b and 1218d are positioned beneath the respective two-footed representations 1212b and 1212d as mnemonic devices to urge the student to jump with both feet on the foot positions 1212b and 1212d in order to "squash the spider." Other caricatures, symbols, etc. may be used in lieu of the spider representations 1218b and 1218d, as desired.

The mat 1200 differs further from the mat 100 by having peripheral attach points 1224 for the attachment of the raised partitions or portions thereto. The raised mat portion attachments 1224 are preferably located at the dividing lines between the various exercise positions 1210a through 1210c, and provide for the attachment of corresponding relatively narrow transverse obstacles 1226 thereto. The obstacles 1226 are preferably formed of a relatively soft and resilient material such as that used to construct the mats 100 through 1200, e.g., a closed cell foam material or other suitable material as desired. Each of the obstacles 1226 includes opposed peripheral end portions 1228 congruent with the corresponding portions of the periphery 1208 of the mat 1200, with corresponding exercise mat attachments 1230 depending therefrom. The various obstacles 1226 are preferably removably attached across the underlying mat 1200, with the raised mat portion attachments 1224 of the underlying mat and the corresponding exercise mat attachments 1230 of the obstacles comprising mating first and second hook and loop fabric fastener material, e.g., Velcro®. Other fastening means may be used as desired, e.g., snaps, buttons, etc., as desired, or the obstacles 1226 may be permanently attached to the underlying mat 1200 by stitching, etc. if so desired.

The mat 1200 equipped with the transverse obstacles 1226 adds a further challenge to the student using the device. The ability to install or remove the obstacles 1226 from the mat 1200, or other mat equipped with appropriate attachment means such as the raised mat portion attachments 1224, enables the instructor to increase the challenge by adding such obstacles thereacross as appropriate to the level of skill of the student without requiring a separate mat. The installation of the attachments along the periphery of the mat 1200 avoids the installation of such attachments to the upper surface 1202 of the mat, thereby providing an unbroken exercise surface for the student.

FIG. 13 illustrates a mat 1300 having a longitudinally disposed raised mat portion 1326 removably attached thereto. The mat 1300 is configured much like the mat 600 of FIG. 6, i.e., having top and bottom surfaces 1302, 1304 defining a thickness 1306 therebetween, a periphery 1308, and a series of exercise positions 1310*a* through 1310*d* and laterally spread foot or other instructional representations 1312*a* through 1312*d* thereon. However, the exercise positions or instructions 1312*a* through 1312*d* of the mat 1300 are all oriented in the same direction, rather than being reversed at every other position as in the case of the mat 600.

This would provide somewhat easier negotiation of the exercise assignment as represented by the mat 1300, except for the longitudinally disposed raised mat portion 1326 extending down the longitudinal center of the mat 1300 between the spread positions 1310*a* through 1310*d* and exercise positions or instructions 1312*a* through 1312*d*. The addition of the raised central area or portion 1326 adds to the challenge of the jumping exercise task indicated by the mat 1300. The raised portion 1326 includes a series of jump positions 1332*a* through 1332*c* thereon, with those positions including corresponding foot or other representations or instructional positions 1334*a* through 1334*c* thereon. Thus, the student or user of the mat 1300 would begin with his or her feet spread to rest upon the two exercise instructional positions 1312*a* at the beginning of the mat, and jump to the first exercise instructional position 1334*a* of the raised central portion 1326. From the instructional position 1334*a*, the student then straddle jumps to the second straddle instructional positions 1312*b* of the primary mat 1300, and so on until completing the exercise upon the final straddle instructional positions 1312*d* at the end of the primary mat 1300.

The raised central portion 1324 may be removably secured to the underlying mat 1300 in much the same manner as used for securing the transverse obstacles 1224 to the underlying mat 1200 of FIG. 12, i.e., using a first fastening means attached to the periphery 1308 of the primary mat 1300, with a second mating fastening means 1330 depending from the congruent end 1328 of the overlying raised portion 1326. The first fastening means attached to the end periphery of the base mat 1300 is not shown in FIG. 13 due to the completed installation of the overlying raised mat portion 1326, but will be understood to be essentially the same as that shown in FIG. 12 for the mat 1200 and its lateral obstacles 1226, discussed further above. The concealed central longitudinal area of the mat 1300 may also include a series of exercise and foot positions thereon in a similar manner to the mat 600 of FIG. 6 if so desired, enabling the mat 1300 to be used for alternating straddle and feet-together jumps with or without the overlying raised central portion 1324.

FIG. 14 illustrates a mat 1400 having yet another detachable raised mat portion therewith. The mat 1400 is configured much like the other mats of the present invention, i.e., having top and bottom surfaces 1402, 1404 defining a thickness 1406 therebetween, a periphery 1408, and at least an initial exercise position 1410 including a foot pair instructional representation 1412 therein. However, the mat 1400 is relatively short and is adapted for the removable attachment of a laterally disposed, raised lateral mat portion 1426 thereacross. The raised lateral portion 1426 attaches to the base mat 1400 in the same manner as used for the removable attachment of the raised portions of the mat embodiments 1200 and 1300 of FIGS. 12 and 13, i.e., a flap of exercise mat attachment material 1430 depends from each of the congruent ends 1428 of the overlying raise portion 1426, to attach removably to a corresponding overlay mat attach material (not shown in FIG. 14, but similar to the components 1224 of the mat 1200 of FIG. 12) provided on the lateral periphery of the underlying base mat 1400. In this manner, no break exists in the upper exercise surface 1402 of the underlying mat 1400 due to the attachment of some form of fastener means thereto, as in the case of the other mats 1200 and 1300 having detachable portions.

The detachable upper mat portion 1426 includes two sets or pairs of foot instructional positions 1434*a* and 1434*b* thereon, and a set or pair of hand instructional positions 1436. This mat 1400 and 1426 combination thus requires the student to bend and squat to place the hands upon the two hand positions 1436 of the upper mat 1426, while simultaneously placing the feet upon the initial instructional position 1412 on the base mat 1400. The student then hops with the feet to jump to the first or center foot instructional position 1434*a*, while keeping the hands on the two hand positions 1436. (The feet markings of the upper center foot position 1434*a* are relatively short, as normally the heels would be raised and only the forward portions of the feet would rest on the upper mat 1426 when the student has his or her hands placed upon the closely spaced hand instructional positions 1436 on the same level.) The exercise may comprise kicking back and forth between the central lower and raised foot instructional positions 1412 and 1434*a*, i.e., "squat-on" or "straddle-on," or perhaps a more advanced exercise in which the feet are spread during the jump to place the feet upon the outer instructional positions 1434*b*.

As in the case of various other examples of the invention discussed further above, the various foot instructional positions 1412, 1434*a*, and/or 1434*b* may be colored or otherwise marked to distinguish them from one another, if so desired. In the example of FIG. 14, it will be noted that the central upper and lower foot instructional positions are colored blue, while the wider upper foot instructional positions are colored red. Thus, the instructor may instruct the student to "jump from the lower blue to the upper blue," i.e., jump from the initial starting instructional position 1412 to the upper central instructional position 1434*a*, or to "jump from the lower blue to the red," i.e., to jump from the lower central initial starting position 1412 in a straddle jump to the more widely spread foot instructional positions 1434*b*, a somewhat more difficult and advanced maneuver.

The various mats are used in keeping with the discussion of the various embodiments above, with the instructor or teacher selecting one or more mats in keeping with the physical and/or cognitive abilities or skill levels of the students and the syllabus, lesson plan, or other arrangement as desired. The selected mats are preferably arranged (physically or otherwise) in increasing order of physical and/or cognitive level of skill required to complete the various exercises designated on the mats. Thus, the instructor may select the mat 200 of FIG.

2, the mat 400 of FIG. 4, and the mat 600 of FIG. 6, for example. These mats need not be placed in a linear array according to their level of difficulty, but may be placed in different areas as desired. The instructor can then assign the student or students to proceed to the selected mat and perform the jumping exercise(s) as designated by that mat.

In many cases, it will be found that a student is quite capable of completing the simplest jump exercises designated by the simpler mats of the series or system. In such cases, the instructor may have the student continue to a more advanced mat, if so desired. Alternatively, the instructor may improvise a greater level of difficulty for the student who has mastered the jumping exercise pattern of a given mat, e.g., performing the exercise backwards, jumping with only one leg and foot, etc. In any event, the instructor will normally begin with the simpler mat exercise patterns that are easier to master, and have the student(s) progress to more difficult jumping exercise patterns, e.g., straddle jumps, etc.

Alternatively, the instructor may assign the student or students to use the mats in accordance with a sequence of increasing levels of cognitive skill. This might be done by having the student(s) perform an initial jumping exercise using the mat 100 of FIG. 1, where the student need only recognize the directional orientation of the foot instructional patterns and jump to place his or her feet accordingly. The next level of cognitive performance may be required by e.g., the mat 400 of FIG. 4, wherein the foot instructional patterns are differentiated by different colors. From there, the student might progress to the mat 200 of FIG. 2 (numbered instructional positions) or the mat 300 of FIG. 3 (lettered instructional positions), etc. Normally, the mats will be formed with their increasing levels of physical difficulty or skill requirements corresponding directly with increasing levels of cognitive difficulty or skill requirements. However, this is not necessarily a requirement, and a review of FIGS. 1 through 14 will show that certain mat embodiments requiring relatively advanced physical or motor skills also require relatively basic cognitive skills, and mats having relatively higher cognitive skill level requirements may have relatively basic motor skill requirements to complete the exercise.

When a student has mastered most or all of the physical jumping exercises of the mats 100 through 1100 of FIGS. 1 through 11, the instructor may add further challenge by attaching the various obstacles or raised mat portions of the mats 1200 through 1400 of FIGS. 12 through 14. It will be understood that any of the previous mats 100 through 1100 may be modified to provide for the peripheral attachment of one or more mat overlays, if so desired. The various overlays or mat attachments may be "mixed and matched" as desired, assuming that appropriate attachments are provided along the peripheries of the base mats and the corresponding edges of the overlay obstacles or raised portions or areas.

The result is an extremely versatile means of providing simultaneous physical and academic training for students who require such. The present system may be applied to very young toddlers to older students who may be able to master the physical or motor aspects but need assistance in cognitive recognition of symbols (e.g., students learning English as a second language, etc.). The advantages provided by the consistent exercise and instructional patterns provide a great improvement over various exercise mat systems and the like developed in the past.

It is to be understood that the present invention is not limited to the embodiments described above, but encompasses any and all embodiments within the scope of the following claims.

I claim:

1. A method of developing motor and cognitive skills, comprising the steps of:
a) providing a plurality of exercise mats ranging from a first exercise mat through a last exercise mat, each of the exercise mats consisting of a single, one-piece structure having an upper surface, a lower surface opposite the upper surface defining a thickness therebetween, and a periphery, wherein each mat includes:
  i) at least three sequential exercise positions disposed upon the upper surface of each of the exercise mats, each of the exercise positions having a first indicia spaced from the periphery and defining a location boundary;
  ii) a plurality of second indicia forming exercise instructions disposed upon the upper surface of each of the exercise mats, the exercise instructions having a single instruction at each of the exercise positions and being located within the location boundary, wherein the indicia forming the exercise instruction comprises a position and orientation for a pair of feet positions, the exercise instructions designating exercises in increasing order of exercise difficulty from the first exercise mat through the last exercise mat;
  iii) a plurality of third distinct indicia indicating the sequential location of the exercise position in the plurality of sequential exercise positions and being located within the location boundary; and
  iv) a plurality of fourth distinct indicia indicating the sequential location of the exercise position in the plurality of sequential exercise positions and being located within the location boundary, wherein the fourth indicia comprise a series of sequential alphanumeric characters;
wherein each exercise mat includes a unique combination of first through fourth distinct indicia, each combination of first through fourth distinct indicia providing a predefined level of cognitive skill difficulty and motor skill difficulty;
b) selecting a series of the exercise mats according to a desired level of cognitive skill difficulty and motor skill difficulty;
c) arranging the selected series of exercise mats in increasing order of cognitive skill difficulty and/or motor skill difficulty, wherein the exercise mats may be arranged in order of increasing cognitive skill difficulty without a corresponding increase in motor skill difficulty, and further wherein the exercise mats may be arranged in order of increasing motor skill difficulty without a corresponding increase in cognitive skill difficulty; and
d) directing at least one user to perform a series of exercises corresponding to the instructions of the selected exercise mats, wherein the at least one user performs the series of exercises corresponding to the instructions of the selected exercise mats, in progressively increasing difficulty of exercise performance.

2. The method of developing motor and cognitive skills according to claim 1, further including the steps of: installing at least one raised mat portion atop at least one of the selected exercise mats and peripherally securing the at least one raised mat portion to the underlying exercise mat.

3. The method of developing motor and cognitive skills according to claim 2, further including the step of removably attaching the at least one raised mat portion to the underlying selected exercise mat.

* * * * *